United States Patent
Aggus et al.

[19]

[11] Patent Number: 5,862,214
[45] Date of Patent: Jan. 19, 1999

[54] LOW COST ADJUSTABLE BASE STAND

[75] Inventors: Trevor J. Aggus, Lincroft; George A. Kopacz, Aberdeen; Steve Oliver Mak, Leonardo; Mark Edward Millman, Holmdel; Bobbie Jo Ridgely, Atlantic Highlands, all of N.J.; John Stoddard, Hackney; Suzy Stone, St Albans, both of England

[73] Assignee: Lucent Technologies Inc., Murray Hill, N.J.

[21] Appl. No.: 556,158

[22] Filed: Nov. 9, 1995

[51] Int. Cl.⁶ .................................................. H04M 1/00
[52] U.S. Cl. ............................................ 379/435; 379/428
[58] Field of Search .................................... 379/428, 436, 379/435, 420

[56] References Cited

U.S. PATENT DOCUMENTS

| | | | |
|---|---|---|---|
| D. 326,263 | 5/1992 | Fuqua et al. | D14/151 |
| 4,797,916 | 1/1989 | Kojima | 379/435 |
| 5,187,743 | 2/1993 | Gumb et al. | 379/346 |
| 5,276,986 | 1/1994 | Thomas | 40/336 |

*Primary Examiner*—Jack Chiang
*Attorney, Agent, or Firm*—Thomas Stafford; Frederick B. Luludis; Gregory J. Murgia

[57] ABSTRACT

A telephone base includes a base module and a rotatable base stand module. The base module may be elevated to a plurality of inclined positions by employing in the base stand modules the plurality of cantilever snap members each of which has a protruding locking member. The telephone base module includes a plurality of locking apertures which correspond to the locking members on the cantilever snap members. The desired inclined positions are obtained by rotating the base module around pivot elements in the base stand module and inserting the locking members on the cantilever snap members into appropriate ones of the locking apertures in the base module. Additionally, the base stand module may be rotated and locked in place to the base module by additional locking members to orient the telephone base for wall mounting. Advantageously all the elements required for the above features are integrally molded into the base module and the base stand module.

7 Claims, 8 Drawing Sheets

LOW COST ADJUSTABLE BASE STAND

TECHNICAL FIELD

This invention relates to telephone base modules and, more particularly, to a telephone base module including a base stand module.

BACKGROUND OF THE INVENTION

Telephone instruments conventionally include a telephone base module and a handset which is supported by the base module when a telephone is not in use. Some more recent telephone instruments have also included a base stand module that is used in conjunction with the base module. Such base stand modules allowed the telephone instrument to be positioned either on a horizontal surface, for example, a desktop or on a vertical surface, for example, a wall. In prior arrangements the base stand module was physically connected to the base module via screws or the like. Consequently, in order to rotate the base stand module from one mounting position to the other, the screws had to be removed and then the base stand could be rotated to the other mounting position. Thereafter, the screws had to be reinserted in order to secure the base stand module to the base module.

There are other telephone base arrangements that can be arranged to be either placed on a desktop or wall mounted. One particular telephone base includes a base module and a removable base stand module. The removable base stand module when placed in one orientation will incline the telephone base to a higher angular position or elevation when attached to the telephone. However there is only one additional possible inclined position and it is fixed. When the base stand module is rotated in another orientation relative to the telephone base the telephone can be wall mounted. Another problem with such an arrangement is that the base stand module is removable and when the telephone base is being used without it, the base stand module may be missed placed. In any event it would have to be located and then physically connected to the telephone base in other to either elevate it or wall mount it.

Additionally, it would be desirable that the telephone instrument could be easily inclined to any one of a plurality of positions. Once the telephone is in a particular position it is also desirable that it cannot be easily moved from that position by applying downward force to the top of the telephone. Similarly, it is also desired that when the telephone is wall mounted that it cannot be easily be pulled off the wall by a pulling force.

SUMMARY OF THE INVENTION

A low cost telephone base module including a rotatable base stand module, wherein the base module may be elevated to a plurality of inclined positions, is realized by employing in the base stand module a plurality of cantilever snap members each of which includes a push tab member and a locking protruding member. The telephone base module includes a plurality of locking apertures which correspond to each of the locking protruding members on the cantilever snap members. The locking apertures on the base module are arranged to correspond to the locking members on the cantilever snap members so that the base module may be inclined, as desired, to any of a plurality of inclined elevations. This is readily realized by simply pushing in on the push tabs on the cantilever snap members to disengage the locking members from the corresponding locking apertures and, then, indexing the base module to the desired inclined elevation. To allow the indexing to different inclined elevations, the base module rotates about pivot elements on the end of the base stand module opposite the end including the cantilever snap members. Additionally, the base stand module is locked to the pivot points by employing locking members which are inserted into locking apertures in the base module.

The base stand module is easily rotated for wall mounting of the base module by simply pushing in on the push tabs to disengage the locking members in order to separate the base stand module from the base module. Then the locking protruding members on the cantilever snap members are inserted into corresponding locking apertures on the opposite end of the base module and the locking members on the pivot side of the base stand module are inserted into corresponding locking apertures on the other end of the base module.

Advantageously, the locking protruding members each have a distinct angled top surface and the locking apertures have a corresponding angled surface so that when the telephone is in a desktop position downward force on its upper surface causes fuller engagement of the locking mechanism. Additionally, each locking member on the cantilever snap members has a lower rib which is angled down and the corresponding locking apertures for the wall mount position have a corresponding angled shape so that greater engagement is provided in response to a pulling force when in the wall mount position.

DETAILED DESCRIPTION

Note that in the following description where the numbered elements are the same and they been described before, they will again be described in detail.

Figure 1:
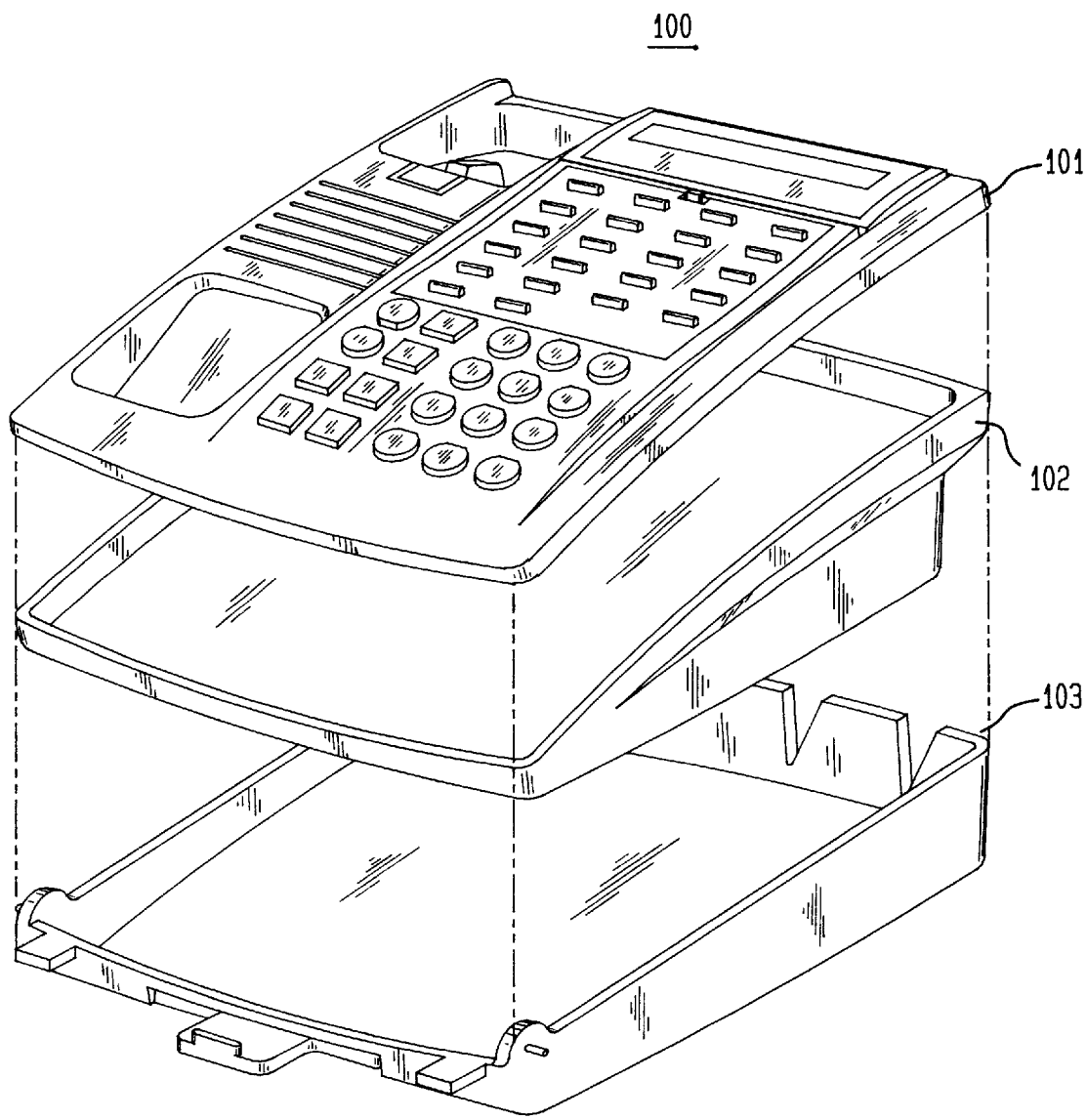
FIG. 1 is an exploded front right perspective view of a telephone base including an upper base module, a lower base module and a base stand module.

FIG. 1 is a perspective view of telephone base 100 including upper base module 101, lower base module 102 and base stand module 103.

Figure 2:
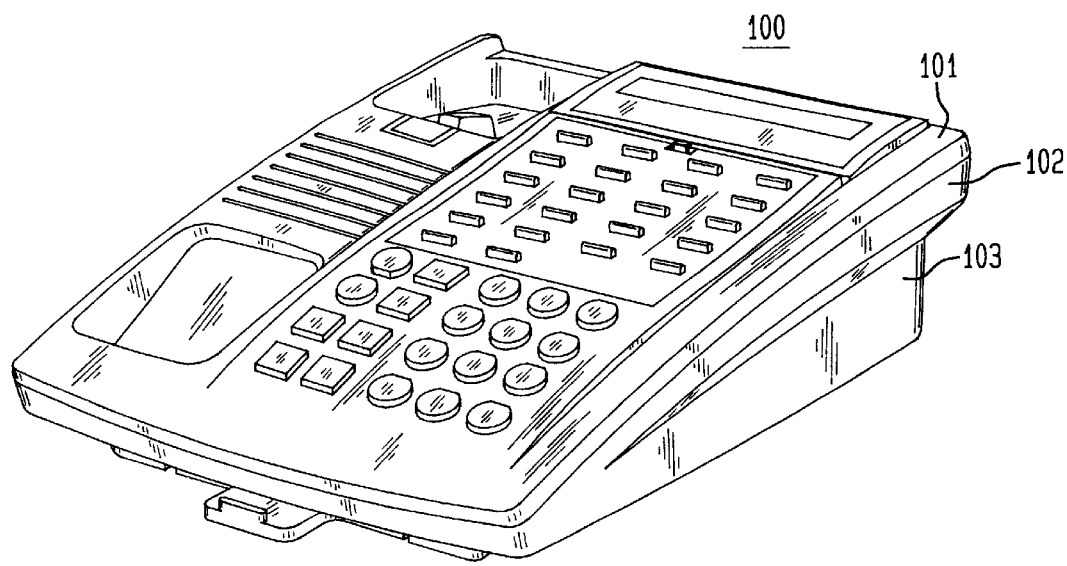
FIG. 2 is a front right perspective view of an assembled telephone base including the base stand module in a desktop mount position.

FIG. 2 is a front right perspective view of telephone base 100 including upper base module 101, lower base module 102 and base stand module 103 assembled for desktop use and being in the lowest inclined elevation.

Figure 3:
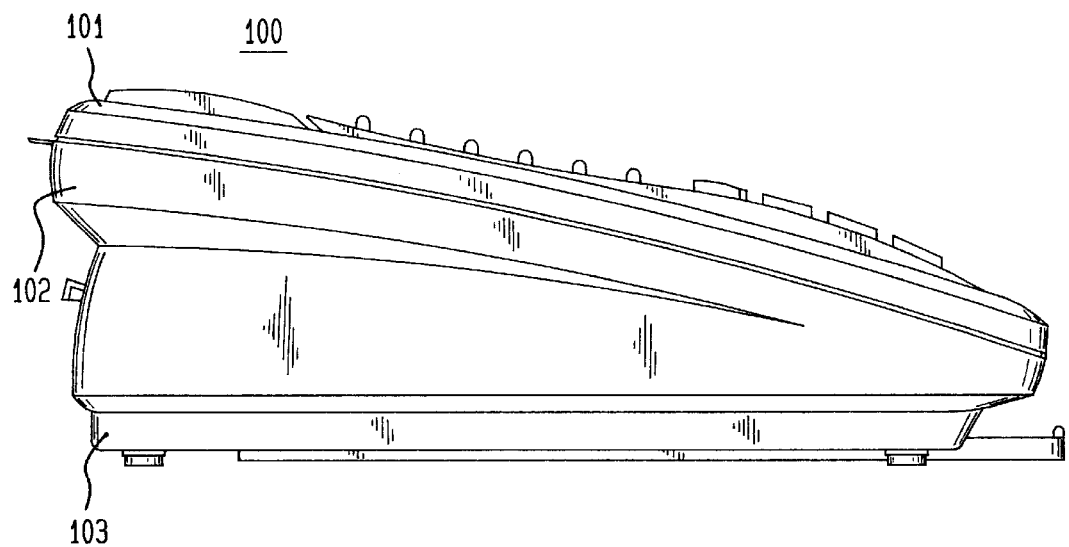
FIG. 3 is a left side view of the telephone base in the desktop mount position.

FIG. 3 is a left side view of telephone base 100 in the desktop mount position of FIG.2.

Figure 4:
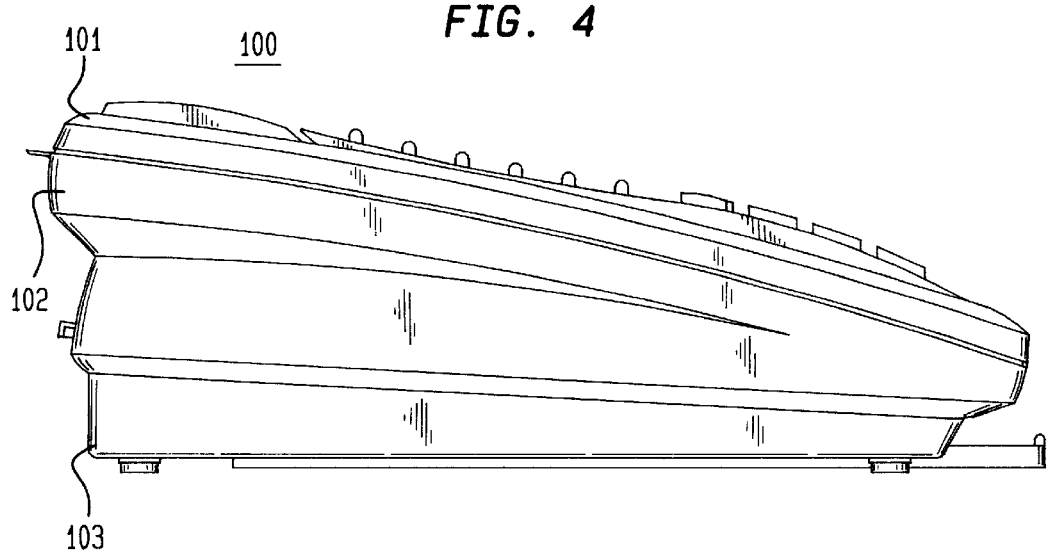
FIG. 4 is a left side view of the telephone base in the desktop mount position showing it inclined to a first elevation or position.

FIG. 4 is a left side view of telephone base 100 in the desktop mount position showing the base module in a first inclined position.

Figure 5:
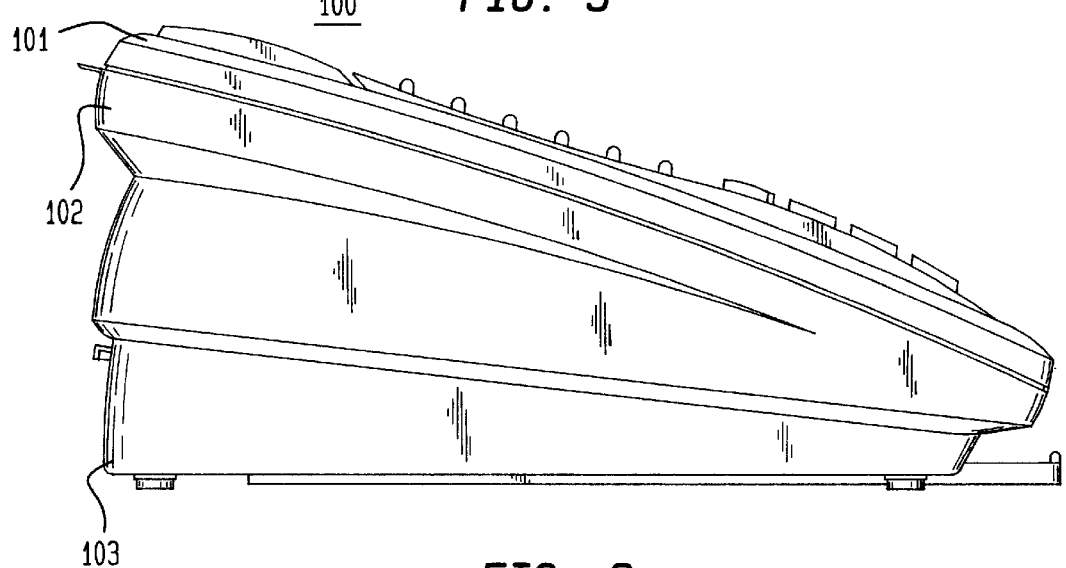
FIG. 5 is a left side view of the telephone base in the desktop mount position showing it inclined to another elevation or position.

FIG. 5 is a left side view of telephone base 100 showing it inclined to another position.

Figure 6:
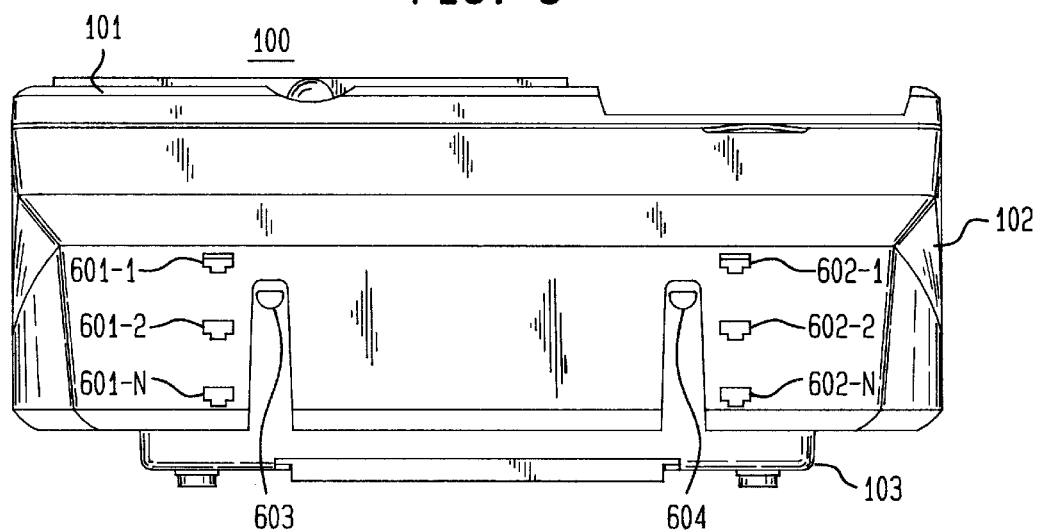
FIG. 6 is a rear view of the telephone base of FIG. 3.

FIG. 6 is a rear view of telephone base 100 of FIG. 3 and illustrating locking apertures 601-1 through 601-N and 602-1 through 602-N in base module 102. Also shown are push tab members 603 and 604 positioned on cantilever snap members (not shown in this FIG.) on base stand module 103. Since the telephone base 100 is shown in its lowest inclined position, corresponding locking members on the cantilever snap members would be inserted in locking aperture 601-1 and 602-1.

Figure 7:
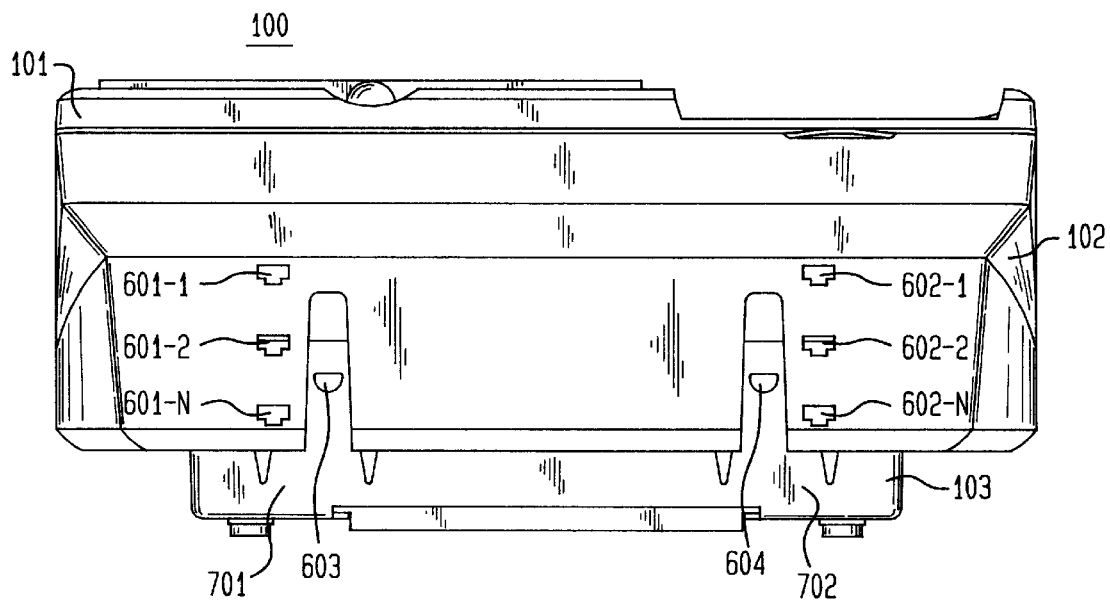
FIG. 7 is a rear view of the telephone base inclined to the first position as shown in FIG.4.

FIG. 7 is a rear view of telephone base 100 inclined to the first position as shown in FIG. 4. Also shown are cantilever snap members 701 and 702 integrally molded in base stand module 103. As indicated above, a locking member is advantageously molded on each of cantilever snap members 701 and 702 which in this inclined position would be inserted into locking apertures 601-2 and 602-2. Indexing of base module 102 is simply realized by pushing in on push tab members 603 and 604 in order to disengage the locking members on cantilever span members 701 and 702 from the ones of locking apertures 601 and 602 and, then, moving the locking members to another one of locking apertures 601 and 602.

Figure 8:
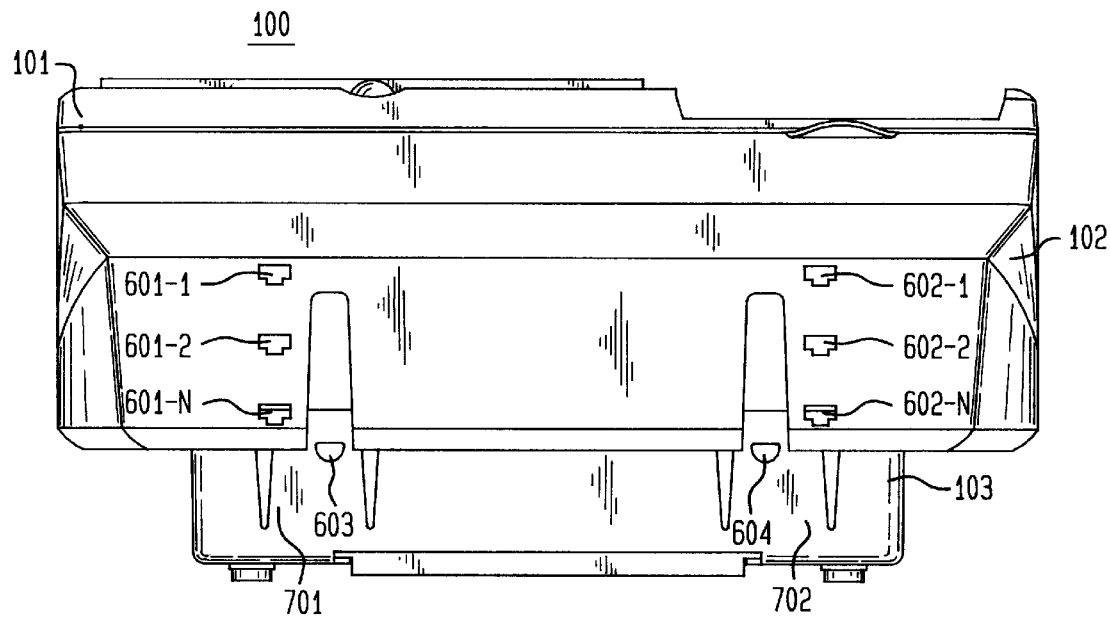
FIG. 8 is a rear view of the telephone base inclined to the other position as shown in FIG.5.

FIG. 8 is a rear view of the telephone base 100 being inclined to the other position as shown in FIG. 5. As shown here, the locking members on cantilever snap members 701 and 702 are inserted into locking apertures 601-N and 602-N.

Figure 9:
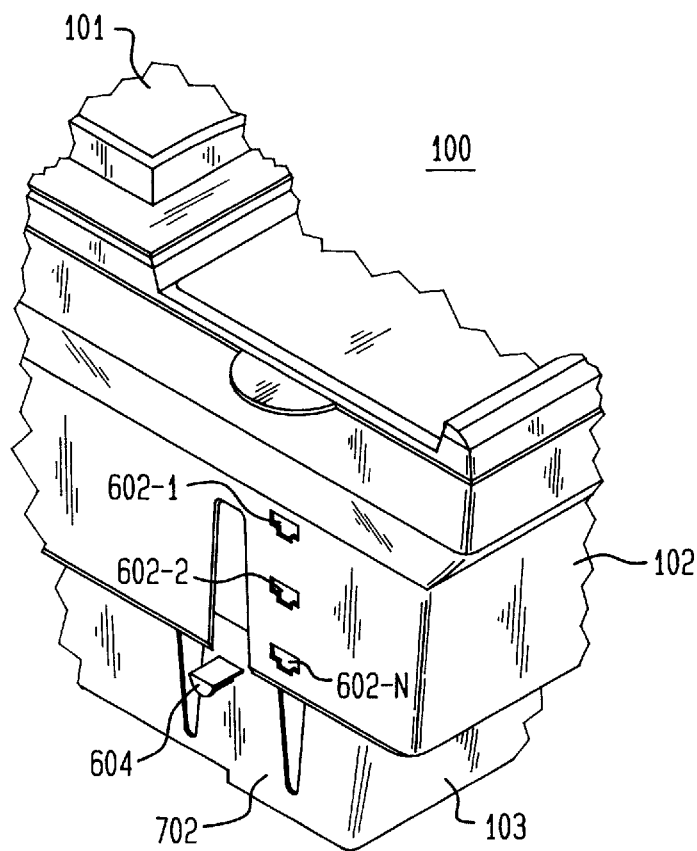
FIG. 9 is a cutaway rear perspective view of the telephone base illustrating the inclined indexing to the position shown in FIG. 5.

FIG. 9 is a cutaway view of telephone base 100 illustrating the inclined indexing to the position shown in FIG. 5. Again, note that the locking member on cantilever snap member 702 is inserted into locking aperture 602-N to realize this inclined position.

Figure 10:
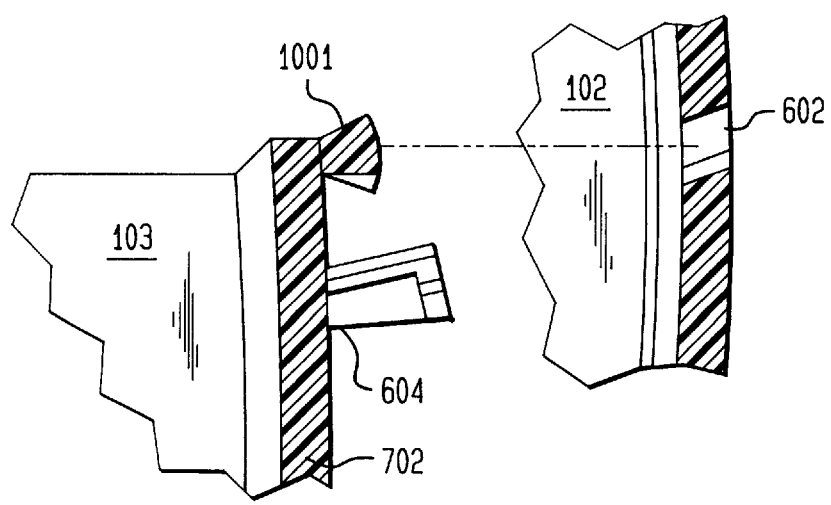
FIG. 10 is a cutaway view of the telephone base module and the base stand module illustrating a locking member and a corresponding locking aperture.

FIG. 10 is cutaway view of base module 102 and base stand module 103 illustrating locking member 1001 and push tab 604 on cantilever snap member 702 on base stand module 103 and a locking aperture in base module 102. Locking member 1001 has an angled top surface which provides fuller engagement when telephone base 100 is in a desktop position upon downward force being applied to the top of telephone base 100. Note that the angle is upward from base stand module 103 to the front of locking member 1001. Further note that locking aperture 602 has a similar angle matching that of locking member 1001. Additionally, locking member 1001 has an angled rib on its lower surface which is angled down from base stand module 103 to the front end of the rib. It is these unique angled elements namely, locking member 1001 and aperture 602 that provide greater engagement of the locking mechanism when in the desktop position.

Figure 11:
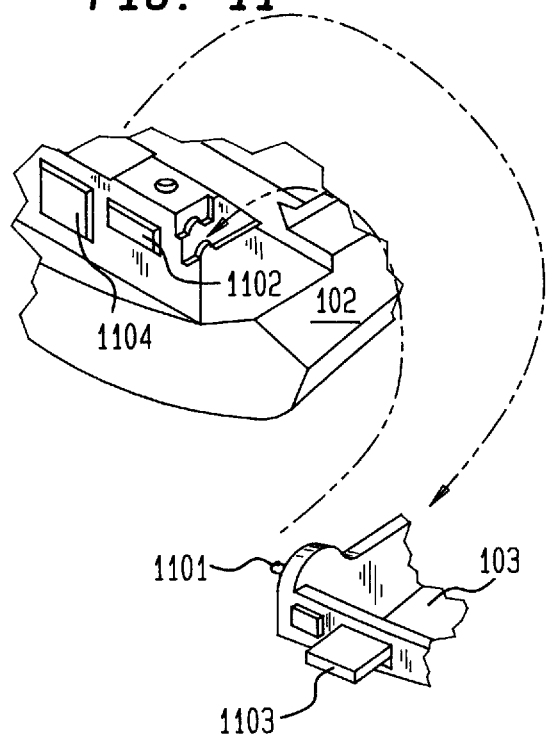
FIG. 11 is a perspective view of the base module and the base stand module illustrating a pivot member and its pivot point.

FIG. 11 is an exploded perspective view of base module 102 and base stand module 103 illustrating pivot element 1101 and a locking member 1103 on base stand module 103 and pivot point 1102 and a locking aperture 1104 into which locking member 1103 would be inserted when base stand module 103 and base module 102 are arranged in a desktop mount position. The base module 102 then would rotate about pivot element 1101 in order to be indexed to any of the desired inclined positions.

Figure 12:
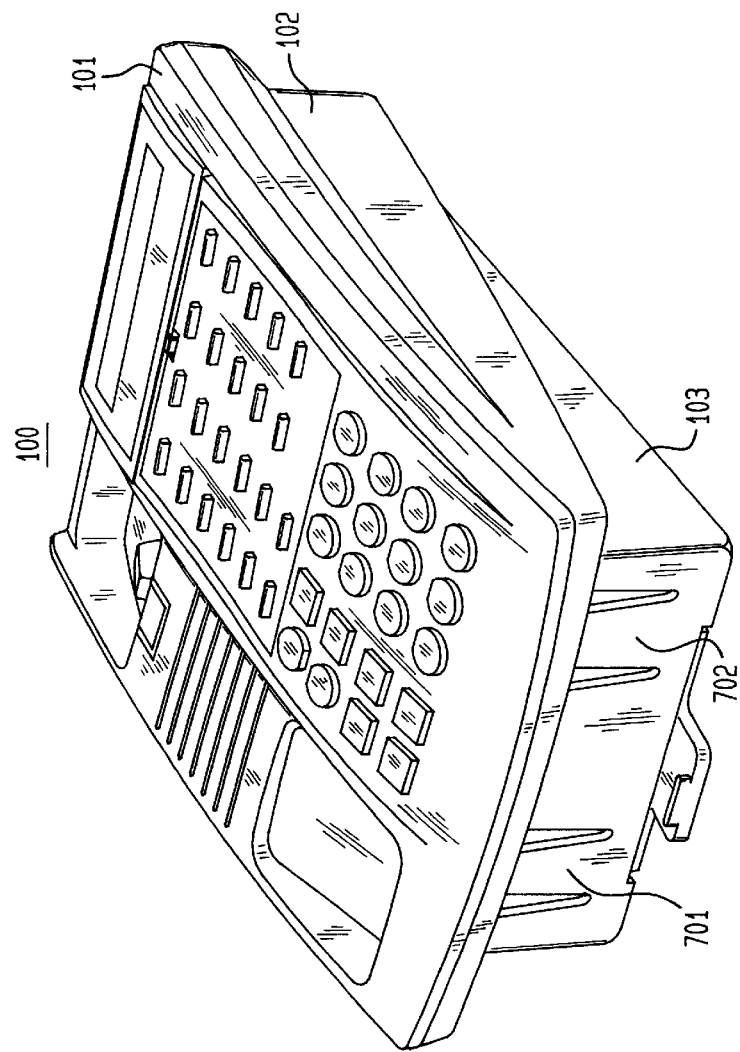
FIG. 12 is a perspective view of the base module and base stand module with the base stand module arranged for wall mounting of the base.

FIG. 12 is a perspective view of telephone base 100 illustrating base stand module 103 being rotated and interconnected with base module 102 in the wall mount position.

Figure 13:
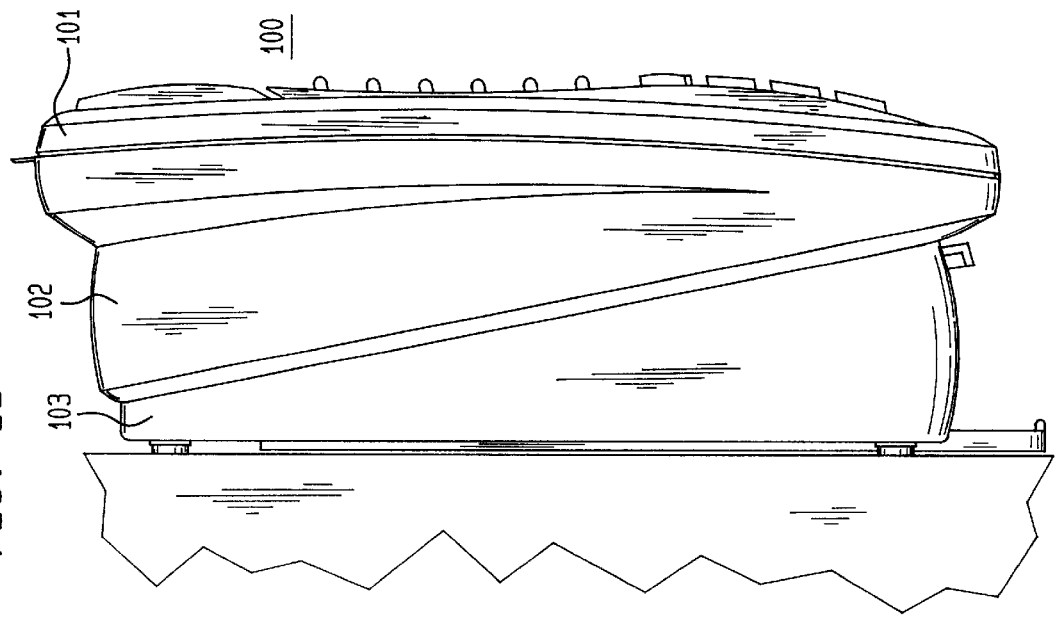
FIG. 13 is a left side view of the base mounted on a wall.

FIG. 13 is a left side view of telephone base 100 with base stand 103 mounted on a wall and base module 102 connected to it in the wall mount position.

Figure 14:
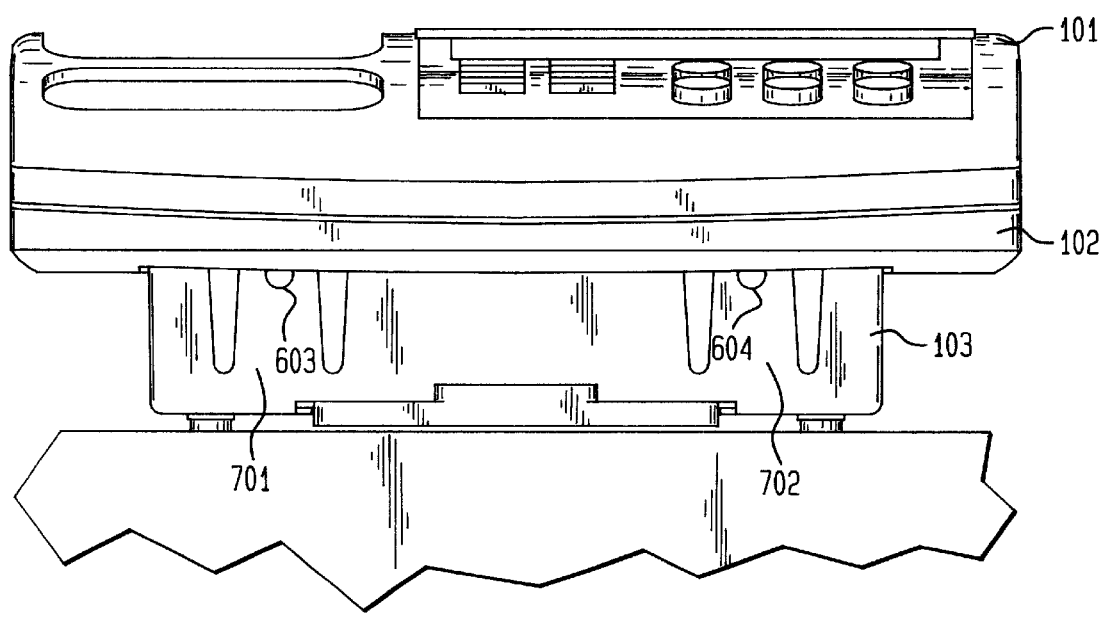
FIG. 14 is a bottom view of the base arrangement of FIG. 13 which is mounted on a wall.

FIG. 14 is bottom view of telephone base 100 mounted on the wall. Not shown in FIG. 14 are locking members on each of cantilever snap members 701 and 702 which are inserted into corresponding locking apertures in base module 102 at its front end.

Figure 15:
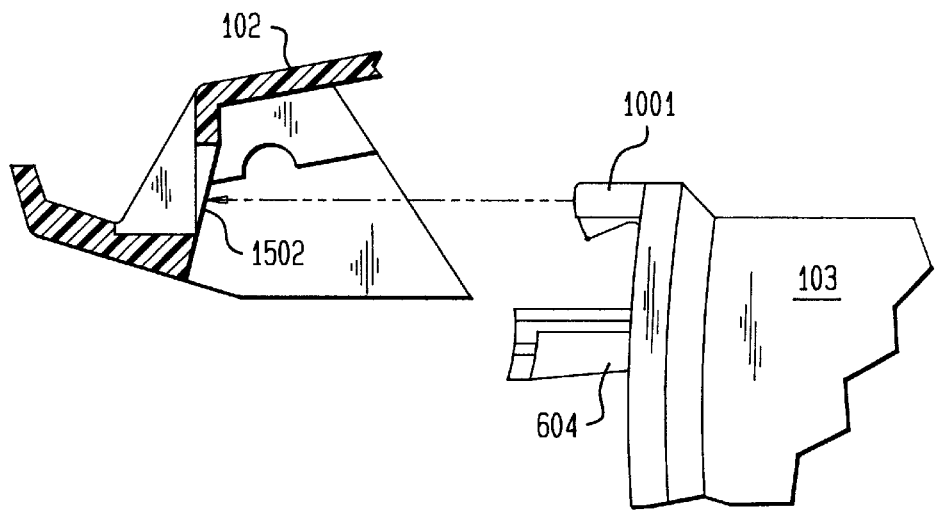
FIG. 15 is a cutaway front view of the base module and base stand module illustrating the locking member and its corresponding locking aperture for wall mounting of the base.

FIG. 15 is a cutaway exploded front view of base module 102 and telephone stand module 103 illustrating locking member 1001, push tab member 604 on base stand module 103 and locking aperture 1502 on base module 102 as illustrated when locking member 1001 is inserted into locking aperture 1502, push tab member 604 will engage the front lower edge of base module 102 and thereby lock base stand module 103 and base module 102 in the wall mount position. This locking arrangement is further illustrated in FIG. 16 which is a cutaway exploded view of telephone base 100 and illustrating the locking mechanism provided by push tab member 604 on cantilever snap member 702 on base stand module 103 and with locking member 1001 inserted in locking aperture 1502 in base module 102. Again, note that the downward angle on locking member 1001 and the corresponding angle in locking aperture 1502 provide fuller engagement of the locking mechanism to a pulling force when base module 102 and base stand module are arranged in the wall mount position.

Figure 17:
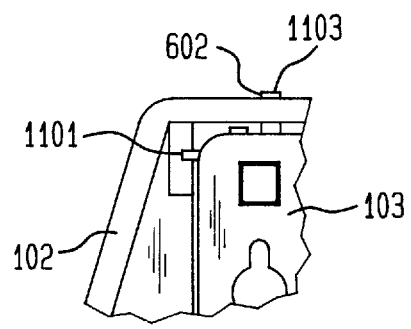
FIG. 17 is a cutaway rear view of the base module and base stand module arranged in the locked wall mount position.

FIG. 17 is a cutaway rear view of telephone base 100 showing the wall mount position of base module 102 and base stand module 103. Also shown is that locking member 1103 is inserted into one of locking apertures 602 in base module 102.

Figure 16:
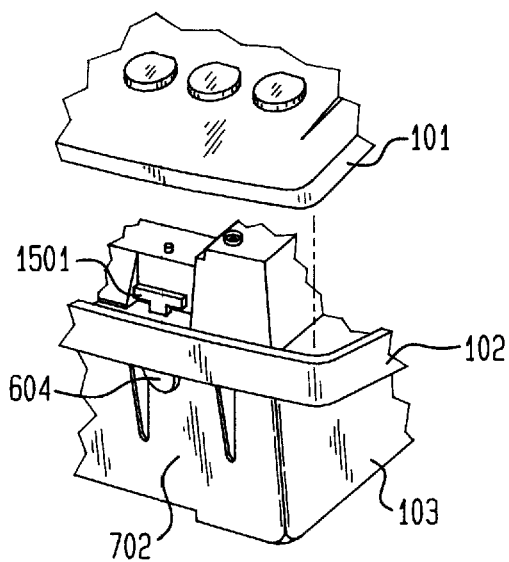
FIG. 16 is a cutaway exploded front view of the base module and base stand module illustrating the base stand module in the locked wall mount position with the front of the base module.

Note that in both FIGS. 16 and 17 only one side of telephone base 100 is illustrated. It will be apparent to those skilled in the art that an identical locking arrangement is provided on the other side of telephone base 100 including similar elements as illustrated in both FIGS. 16 and 17.

It should also be noted that all the elements for positioning the telephone base in either the inclined desktop positions or the wall mount position and for locking base module 102 to base stand module 103 are integrally molded into base module 102 and base stand module 103.

What is claimed:

1. A telephone base comprising at least:

a base stand module including at least two cantilever snap members on one end, each of the cantilever snap members having a locking member extending therefrom, said base stand module including pivot elements at the end opposite the end including the cantilever snap members, said base stand module having a predetermined inclined shape so that it can provide a horizontal position or a wall mount position for the telephone base; and a base module having a plurality of locking apertures therein which are positioned to allow the telephone base to be used in the horizontal position or the wall mount position by inserting the locking members on the cantilever snap members into appropriate ones of the plurality of locking apertures, said base module including pivot points for engaging the pivot elements so that the base module can be inclined by rotating the base module about the pivot elements and engaging appropriate ones of the plurality of locking apertures by the locking members on the cantilever snap members.

2. A telephone base as defined in claim 1 wherein said base stand module further includes at least one additional locking member at the end opposite the end including the cantilever snap members, said at least one additional locking member for engaging appropriate ones of the plurality of locking apertures on said base module.

3. A telephone base as defined in claim 1 wherein said locking members on the cantilever snap members each have an angled top surface and wherein each of said plurality of locking apertures on said base module have a corresponding angled surface so that engagement between said locking members and said appropriate ones of the plurality of locking apertures is increased in response to a downward force when the telephone base is in the horizontal position.

4. A telephone base as defined in claim 3 wherein each of said locking members on the cantilever snap members further includes a bottom surface having a downwardly angled rib and wherein each of said plurality of locking apertures on said base module have a corresponding angled shape so that engagement between said locking members and said appropriate ones of plurality of locking apertures is increased in response to a pulling force when the telephone base is in the wall mount position.

5. A telephone base comprising at least:

a base stand module including at least two cantilever snap members on one end, each of the cantilever snap members having a locking member extending therefrom, said base stand module having a predetermined inclined shape so that it can provide a horizontal position or a wall mount position for the telephone base, said base stand module further including pivot elements at the end opposite the end including the cantilever snap members; and a base module having a plurality of locking apertures therein which are positioned to allow the telephone base to be used in the horizontal position or the wall mount position by inserting the locking members on the cantilever snap members into appropriate ones of the plurality of locking apertures on said base module, said base module further including pivot points for engaging the pivot elements on the base stand module so that the base module can be inclined by rotating the base module about the pivot elements, wherein said base stand module further includes at least one additional locking member at the end opposite the end including the cantilever snap members, said at least one additional locking member for engaging appropriate ones of the plurality of locking apertures on said base module.

6. The telephone base according to claim 5 wherein said locking members on the cantilever snap members each have an angled top surface and wherein each of said plurality of locking apertures on said base module have a corresponding angled surface so that engagement between said locking members and said appropriate ones of the plurality of locking apertures is increased in response to a downward force when the telephone base is in the horizontal position.

7. The telephone base according to claim 6 wherein each of said locking members on the cantilever snap members further includes a bottom surface having a downwardly angled rib and wherein each of said plurality of locking apertures on said base module have a corresponding angled shape so that engagement between said locking members and said appropriate ones of plurality of locking apertures is increased in response to a pulling force when the telephone base is in the wall mount position.

\* \* \* \* \*